United States Patent [19]
Richardson

[11] Patent Number: 5,598,903
[45] Date of Patent: Feb. 4, 1997

[54] ACCELERATION SENSITIVE FLOW SENSITIVE MCPHERSON STRUT

[75] Inventor: Donald G. Richardson, Sutter Creek, Calif.

[73] Assignee: Ricor Racing & Development, L.P., Sutter Creek, Calif.

[21] Appl. No.: 518,858

[22] Filed: Aug. 24, 1995

Related U.S. Application Data

[63] Continuation of Ser. No. 210,716, Mar. 18, 1994, abandoned, which is a continuation-in-part of Ser. No. 958,560, Oct. 8, 1992, abandoned, which is a continuation-in-part of Ser. No. 878,850, May 5, 1992, Pat. No. 5,462,140.

[51] Int. Cl.$^6$ .................................................. F16F 9/46
[52] U.S. Cl. ..................... 188/275; 188/269; 188/322.14
[58] Field of Search .................................. 188/269, 297, 188/298, 275, 314, 315, 319, 322.14, 280, 281, 284, 285; 280/668

[56] References Cited

U.S. PATENT DOCUMENTS

| | | | |
|---|---|---|---|
| 2,252,772 | 8/1941 | Katcher | 188/275 |
| 2,774,448 | 12/1956 | Hultin | 188/275 |
| 3,189,133 | 6/1965 | Dillenburger | 188/269 |
| 3,380,560 | 4/1968 | Katz | 188/275 |
| 4,917,222 | 4/1990 | Simon Bacardit | 188/275 |

FOREIGN PATENT DOCUMENTS

| | | | |
|---|---|---|---|
| 8902548 | 3/1989 | WIPO | 188/269 |

Primary Examiner—Matthew C. Graham
Attorney, Agent, or Firm— Christie, Parker & Hale, LLP

[57] ABSTRACT

A modified McPherson strut has inner and outer tubes which are connected to the wheel of a vehicle. A piston within the inner tube is connected to a piston rod which is connected to the body of a vehicle. The piston divides the inner tube into an upper chamber and a lower chamber, with the upper chamber being in fluid communication with an annular gallery formed between the inner and outer tubes. Normal damping is provided by fluid passing though metering valves in the piston between the upper and lower chambers. The strut also includes an accumulator gallery inside the bottom of the outer tube with a foot valve for restricted fluid flow from the lower chamber into the accumulator gallery and essentially unrestricted flow from the accumulator gallery back into the lower chamber. An acceleration sensitive inertial mass in a bypass passage is normally closed and opens upon upward acceleration of the tubes during strut compression. This bypasses fluid directly from the lower chamber into the accumulator gallery, making the strut "softer." Similarly, a rebound inertial mass in another bypass passage opens a valve when the downward acceleration of the tubes is greater than a selected magnitude. A restricted flow path is provided downstream from the rebound inertial valve opening for maintaining the inertial mass in a port-open position in response to fluid flow past the rebound inertial mass.

37 Claims, 2 Drawing Sheets

5,598,903

1

ACCELERATION SENSITIVE FLOW SENSITIVE MCPHERSON STRUT

This application is a continuation of application Ser. No. 08/210,716, filed Mar. 18, 1994 now abandoned, which is a continuation in part of U.S. patent application Ser. No. 07/958,560 filed Oct. 8, 1992 now abandoned which is a continuation in part of U.S. patent application Ser. No. 07/878,850, filed May 5, 1992 now U.S. Pat. No. 5,462,140. It is also related to U.S. patent application Ser. No. 07/798,036, filed Nov. 20, 1991, which is a continuation of U.S. patent application Ser. No. 07/503,881, filed Apr. 3, 1990, and to U.S. patent application Ser. No. 07/270,010, filed Nov. 14, 1988, now U.S. Pat. No. 4,958,706. The subject matter of the prior applications is hereby incorporated by reference.

BACKGROUND OF THE INVENTION

This invention relates to a type of automotive shock absorber commonly called a McPherson Strut. The invention concerns a McPherson strut with damping characteristics that decrease upon rapid acceleration of the part of the strut connected to the vehicle wheel. It also concerns fluid flow or pressure sensitivity, in addition to acceleration sensitivity in the strut.

Hydraulic shock absorbers are essentially universally employed in automotive vehicles. Each wheel of the vehicle is coupled to the vehicle chassis or frame by a spring so that bumps or dips in the road are not transmitted directly to the passengers or vehicle load. A spring alone, however, would still give a rough ride. Shock absorbers are therefore mounted in parallel with the springs to damp the accelerations applied to the chassis from the wheel. There is a long history of shock absorber development to obtain desired characteristics of passenger comfort, handling for steering, road traction and the like.

Most shock absorbers are designed to have a certain operating characteristic or load-velocity curve which is a compromise of the characteristics desired for a variety of road conditions. The characteristics suitable for driving on relatively smooth road may, however, be inappropriate where the vehicle wheels may encounter short range bumps or dips. Such conditions are not limited to vehicles like those used on off-road terrain, but also include ordinary passenger and freight vehicles which may unexpectedly encounter chuck holes, speed bumps or foreign objects on the roadway.

In the prior applications, there are described shock absorbers which respond to accelerations of a vehicle wheel for providing automatic adjustment of orifices in the shock absorber for changing the characteristics of the shock absorber when it encounters compression or extension due to terrain defects. A single tube shock absorber with a piston in a cylinder and an acceleration sensitive mechanism in the piston is described in U.S. patent application Ser. No. 07/798,036. An acceleration sensitive twin tube shock absorber is described in U.S. patent application Ser. No. 07/878,850.

Another type of shock absorber used on a variety of automobiles is a McPherson strut. This is a type of twin tube shock absorber with the tubes connected to the wheel of a vehicle and the piston connected to the vehicle body. There are metered orifices in the piston which control the flow of fluid during compression or extension of the strut, thereby controlling the damping characteristics. A pressure relief foot valve at the lower end of the strut allows free flow of

2 fluid from the annulus between the tubes to a chamber below the piston in the inner tube during extension of the shock absorber. During compression, the foot valve has a metered orifice that opens at a substantially higher pressure than the orifice in the piston to assure that fluid is forced through the piston during compression. A standard McPherson strut does not require gas pressurization for preventing cavitation.

The annular space between the inner and outer tubes of a McPherson strut is quite narrow, thus there insufficient space for acceleration sensitive valving as described in the prior applications. Acceleration sensitive shock absorbers have demonstrated a remarkable ability to improve the performance of vehicles equipped with such shock absorbers. It is, therefore, desirable to provide a similar arrangement or a vehicle which employs McPherson struts.

SUMMARY OF THE INVENTION

There is, therefore, provided in practice of this invention according to a presently preferred embodiment an acceleration sensitive McPherson strut having a inner and outer tubes defining an annular fluid return gallery between the tubes. A piston in the inner tube divides the inner tube into an upper chamber and a lower chamber. The tubes of the strut are connected to the wheel of a vehicle and the piston is connected to the chassis of the vehicle. Shock absorber fluid can pass through the piston between the upper and lower chambers with a restricted flow rate during either extension or compression of the strut. There is a closed accumulator gallery inside the bottom of the outer tube and a foot valve between the lower chamber and the accumulator gallery. The foot valve includes a compression check valve for fluid flow from the lower chamber into the accumulator gallery and an open passage for fluid flow from the accumulator gallery into the lower chamber.

A bypass passage provides closable fluid communication between the lower chamber and one of the galleries. A movable inertial mass in the bypass passage opens the bypass passage upon acceleration of the strut tubes and increases flow of fluid between the lower chamber and such a gallery in the event of acceleration of the strut tubes at more than a preselected magnitude.

In addition, the acceleration sensitive shock absorber has means for biasing the inertial mass towards a port-open position in response to fluid flow between the chambers.

Preferably, there is a rebound bypass passage between the lower chamber and the annular gallery and the movable inertial mass is in the rebound bypass passage for opening the rebound bypass passage upon downward acceleration of the strut tubes, thereby increasing flow of fluid from the annular gallery into the lower chamber during extension of the strut at more than a preselected acceleration.

BRIEF DESCRIPTION OF THE DRAWINGS

These and other features and advantages of the present invention will be better understood by reference to the following detailed description when considered in connection with the accompanying drawings wherein.

DETAILED DESCRIPTION

Figure 1:
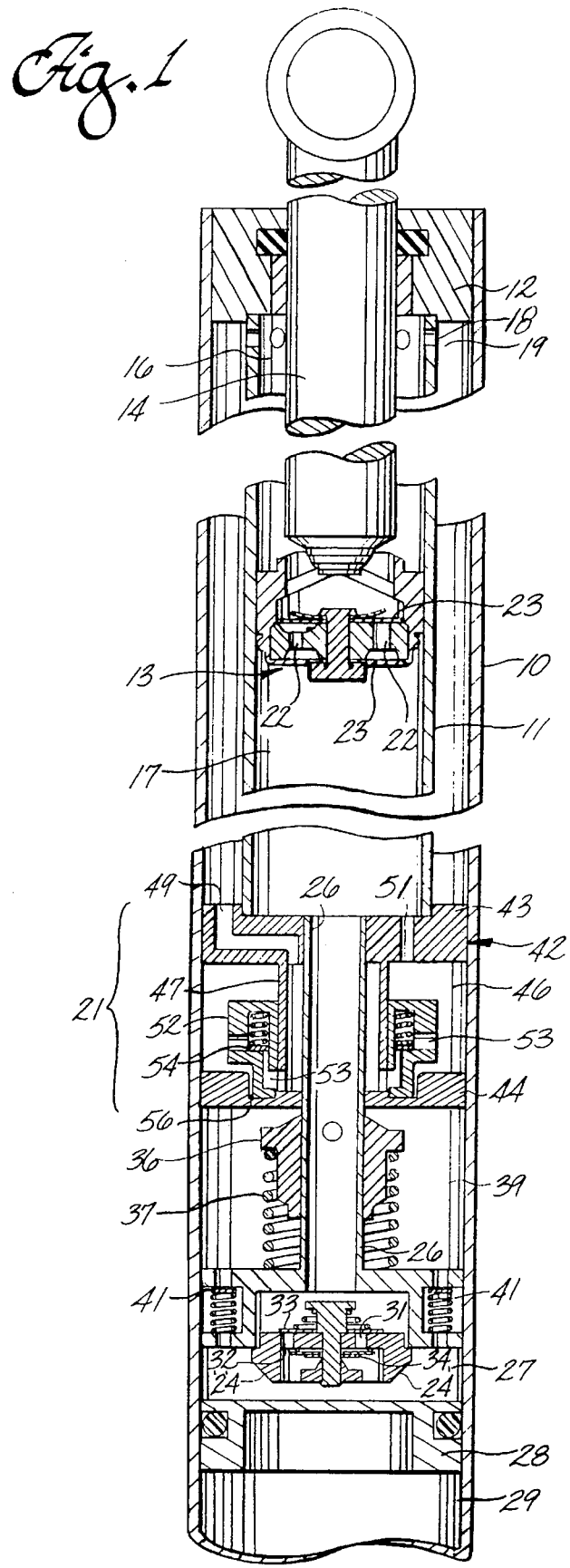
FIG. 1 illustrates in longitudinal cross-section an acceleration sensitive McPherson strut constructed according to principles of this invention when there is no acceleration of the vehicle wheel.

A McPherson strut is a long end slender shock absorber, the outer tube 10 of which is typically secured to the wheel spindle of an automobile. The outer tube typically fits into a socket on the spindle (not illustrated). There is an inner tube 11 fixed to the outer tube such as by a cap 12 at the top of the strut. A piston 13 on the lower end of a piston rod 14 divides the inside of the inner tube into an upper chamber 16 and lower chamber 17. The piston rod is sealed through the cap and a ring at the top connects the piston to the chassis or sprung weight of the automobile. A row of holes 18 near the top of the inner tube provides fluid communication between the upper chamber and an annular fluid return gallery 19 between the inner and outer tubes. A rebound bypass passage, as described in greater detail hereinafter provides for fluid communication between the lower chamber and the annular fluid return gallery.

The piston assembly is the same as on a conventional McPherson strut. It includes longitudinally extending passages 22 and disk type check valves 23 between the upper and lower pistons. One such passage and check valve is arranged for metering fluid flow through the piston during compression of the strut, that is, when the tubes move upwardly relative to the piston. The other passage and check valve is arranged for metering fluid through the piston during extension or rebound of the check valve, i.e., when the tubes move downwardly relative to the piston. The metering of fluid through the piston provides the resistance to displacement and damping of spring motion by the strut. The conventional piston structure and performance parameters of a McPherson strut may be employed.

A foot valve 24 similarly to that employed in a conventional McPherson strut is fixed in the outer tube above the bottom of the strut. The foot valve communicates with the lower chamber by way of a central tube 26. The bottom of the foot valve communicates with an accumulator gallery 27 within the bottom of the outer tube. In this embodiment, the accumulator gallery has shock absorber liquid above a piston 28 sealed in the outer tube. The volume 29 below the piston contains a gas such as nitrogen. As will become apparent from a description of the operation of the strut, the gas volume is variable for accommodating displacement of the shock absorber fluid as the piston rod moves into or out of the shock absorber during compression or extension of the strut, respectively. During compression of the strut, the accumulator piston 28 moves downwardly and gas is compressed. Upon extension of the strut, the compressed gas in the accumulator gallery forces shock absorber fluid upwardly through the foot valve into the lower chamber.

A piston in the gas accumulator gallery is only one way of separating the gas from liquid. It may be preferable to employ a closed cell compressible foam in a gas accumulator gallery. Alternatively, a rolling diaphragm may be used for separating gas and liquid. The gas in the accumulator gallery is not necessarily pre-pressurized. Cavitation is not regarded as a problem, which is the reason other shock absorbers are pressurized. The role of the gas is to accommodate the displacement of the piston rod as it moves into the upper chamber. However, if desired, some pressurization may be applied to the gas when the shock absorber is assembled.

The foot valve has a downward flow passage 31 relatively nearer the axis of the strut. There is an upward flow passage 32 radially further from the axis of the strut. The upward flow passage is lightly closed by a check valve 33 which permits essentially unrestricted upward flow through the passage and prevents downward flow. The downward flow passage 31 is closed by a disk or disks 34 which act as springs and form a metering pressure relief valve. Thus, during compression of the strut, fluid pressure against the disk deforms the disk and permits flow through the foot valve. As is conventional in this valve and in the similar valves in the piston 18, flow is metered with increasing flow at increasing pressure.

An annular compression inertial mass 36 is positioned around the central tube 26 above the foot valve. The weight of the inertial mass is supported by a coil spring 37. When the inertial mass is in its rest position without acceleration of the strut, it closes a port or ports 38, as illustrated at the right side of FIG. 2.

In the event the tubes of the McPherson strut are accelerated upwardly, the inertial mass tends to remain in a fixed position in space. When the upward acceleration of the tubes exceeds a selected magnitude, the inertial mass compresses the spring and opens the ports through the wall of the central tube. The inertial mass is illustrated moved downwardly in the left side of FIG. 2 for opening the ports. It will be recognized, of course, that the mass essentially remains stationary and the tubes move upwardly.

Thus, the ports and compression inertial mass form an inertial valve that opens upon upward acceleration or compression of the shock absorber. When the inertial mass opens the ports through the wall of the central tube, shock absorber fluid from the lower chamber can flow into a lower bypass chamber 39. Increased pressure in the bypass chamber acts on one or more check valves 41 which communicate with the accumulator gallery. Thus, when the ports are opened by displacement of the inertial mass, fluid can bypass the foot valve and flow from the lower chamber into the accumulator chamber.

The opening pressure for the metering valves through the piston is very much lower than the opening pressure through the foot valve. Thus, upon compression of the strut, fluid is metered through the piston for damping compression of the vehicle spring. The bypass check valves 41 have an opening pressure intermediate between the piston valve and the foot valve. Thus, in the event the compression acceleration is greater than a selected magnitude, the inertial valve opens the ports and some of the fluid flows directly from the lower chamber into the accumulator gallery. Some fluid may also flow through the piston. Opening of the ports of the inertial valve significantly enhances flow rate of fluid from the lower chamber, and thereby instantly makes the strut considerably "softer", thereby, permitting the vehicle wheel to move more readily toward the body.

When compression of the strut stops, the inertial valve is closed by the spring and fluid can flow in the reverse direction as the strut extends. Gas in the accumulator gallery compressed by the liquid causes reverse flow through the upward flow passage 32 and check valve 33 from the accumulator gallery into the lower chamber below the piston.

There is a plug 42 in the outer tube at the bottom of the inner tube and above the lower bypass chamber 39. As illustrated in the drawings, the rather complex plug geometry is illustrated semi-schematically as if it were made of a single piece. It will, of course, be recognized as additional structure is described that the plug is actually assembled from a number of separately manufactured pieces. Other parts of the shock absorber illustrated as single pieces may also be actually assembled from separate parts.

The plug has an upper plate 43 and a lower plate 44 defining an annular bypass passage 46 therebetween. An annular conduit 47 concentric with the central tube 26 interconnects the upper and lower plates. One or more ports 48 extend through the lower portion of the conduit. There is a passage 49 between the annular fluid return gallery 19 and the inside of the conduit. There is another passage 51 through the top plate between the lower chamber 17 under the piston to the annular bypass passage 46.

A rebound inertial mass 52 is in the annular bypass passage around the conduit. There is one or more relief flow paths 53 extending radially through the inertial mass. When the inertial mass is in its rest position (i.e, when there is no acceleration of the strut) the lower end of the flow path is aligned with the ports 48 through the wall of the conduit. The outer end of the flow path is in the annular bypass passage 46. Each relief flow path is closed by a spring loaded pressure relief valve 54 which prevents radially inward flow through the flow path and permits radially outward flow when the pressure exceeds the opening pressure of the relief valve.

During extension of the McPherson strut, the piston moves upwardly in the inner tube (or the tubes move down relative to the piston). Shock absorber fluid is metered through the piston for damping the associated spring of the vehicle. The pressure relief valve has a high opening pressure so that fluid is normally metered through the piston. As explained hereinafter, the pressure relief valve is present primarily to prevent "water hammer" when an acceleration sensitive valve closes.

Figure 2:
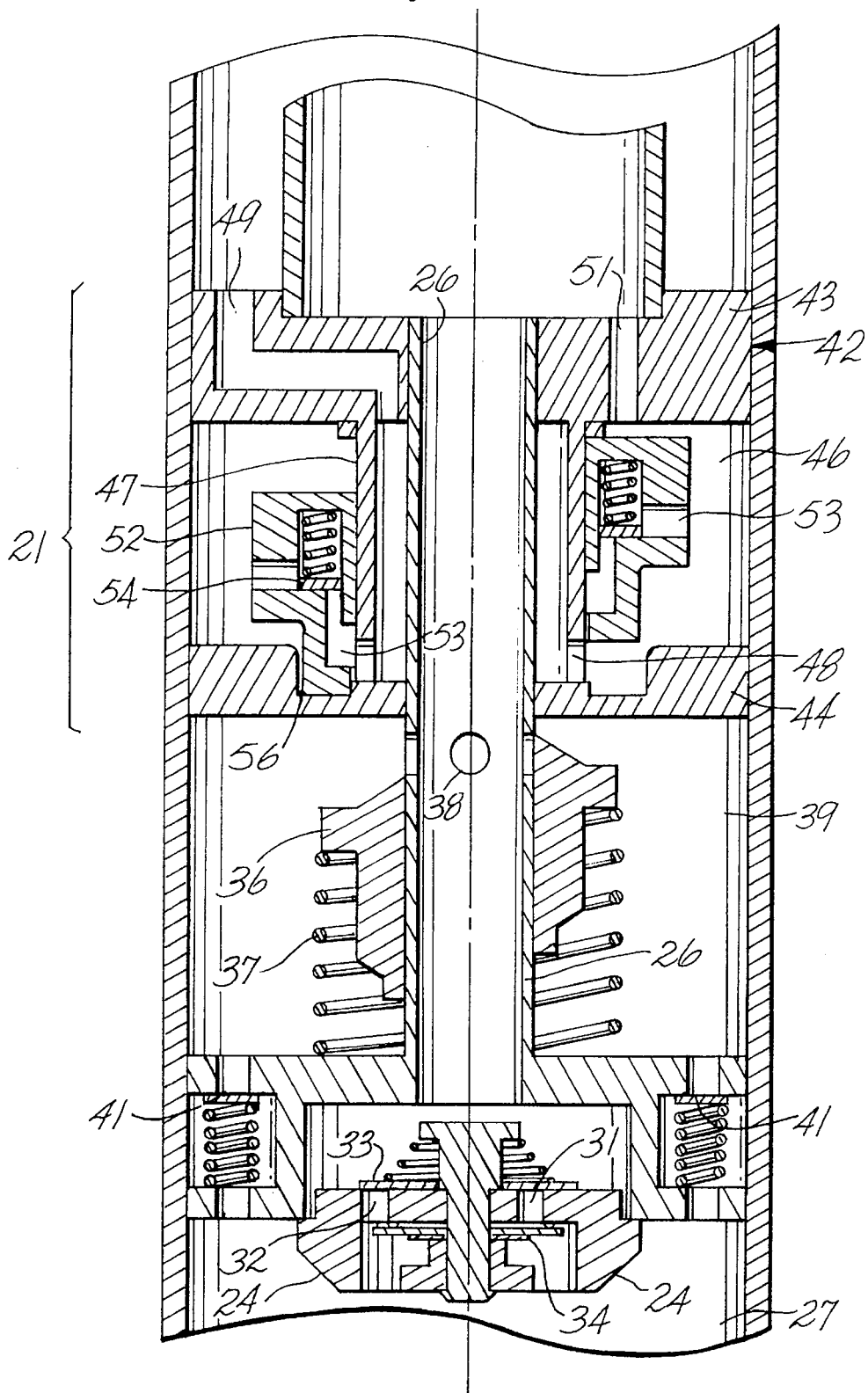
FIG. 2 is a fragmentary longitudinal cross-section of a lower portion of the strut with the left half of the cross-section illustrating the position of movable masses during compression acceleration of the strut and the right half indicates positions of the movable masses during extension or rebound acceleration of the strut.

As has been mentioned, the rest position of the rebound inertial mass 52 is toward the lower end of its travel, as illustrated on the left side of FIG. 2. When in this position, the ports 48 through the conduit are normally closed by the inertial mass (except in the event the pressure in the annular gallery is very high). Upon rapid extension of the shock absorber, the tubes move downwardly and the rebound inertial mass remains essentially fixed in space and therefore, moves to a relatively upward position, as illustrated in the right side of FIG. 2. This displacement of the rebound inertial mass opens the ports through the conduit, permitting direct fluid flow from the annular gallery through the rebound bypass passage into the lower chamber, thereby making the McPherson strut instantly "softer."

It has been found desirable to maintain the rebound inertial valve in an open position (as illustrated on the right side of FIG. 2) even after rebound acceleration has diminished. A restricted flow path is therefore provided downstream from the ports 48 controlled by the rebound inertial valve member for hydraulically biasing the rebound inertial mass toward its open position as fluid flows from the upper chamber to the lower chamber.

This restricted flow path is provided by a small annular clearance 56 between an inside diameter in the lower plate 44 and a circumferential outside surface on the rebound inertial mass. When the inertial valve is completely closed as illustrated on the left side of FIG. 2, an exemplary clearance between the inside of the lower plate and the outside of the inertial mass is as low as 0.5 millimeter. The relative areas and spacings of the ports 48 and the restricted flow path between the lower plate and inertial mass are such that the restricted flow path has a smaller area than the ports when the ports are open, except for a short distance when the ports are almost closed.

Thus, when the inertial valve is partly or fully open, the cross-sectional area for fluid flow through the restricted flow path is less than the cross-sectional area for fluid flow through the ports in the conduit. Because of the restricted flow path downstream from the ports there is a higher pressure in the space between the lower plate and the inertial mass than there is in the rebound bypass passage 46. This hydraulic pressure differential between the lower end of the inertial mass and its upper end biases the acceleration sensitive valve toward its open position.

The outside edge of the lower end of the inertial valve member has a radius and there is a radius on the top of the lower plate adjacent to the annular clearance 56. The restricted flow path for flow control downstream from the ports has an area controlled by the annular clearance between the lower plate and inertial member until near the upper end of the travel of the inertial mass when the two radii begin to enlarge the distance between these members, and the flow area increases. Even when fully open as illustrated in the right side of FIG. 2, the flow area through the restricted flow path is less than the flow area through the ports. Conversely, when the inertial valve starts to close, the area of the restricted flow path decreases for a short part of the stroke and then remains essentially constant for the rest of the stroke.

As the inertial mass moves from its open position toward its closed position, the pressure in the space between the end of the inertial mass and the lower plate increases while fluid is flowing through the ports and restricted flow path. The increased pressure retards closing of the valve, thereby permitting rapid flow of fluid for a longer period.

The radial clearance and the radii help determine the pressure in the space under the inertial valve member, and hence the tendency of the valve to remain open. Making the radial clearance rather tight can make the inertial valve stay open too long. Increasing the clearance makes the inertial valve close sooner. The magnitude of clearance, i.e. the area of the restricted flow path, may be selected depending on the use to be made of the strut. A wider clearance is suitable for an off-road race car which encounters rough terrain at high speed where rapid shock absorber performance is required. For an automobile for more customary street usage where bumps and dips are encountered at a slower pace, a smaller clearance is preferable for an inertial valve that stays open longer.

The pressure relief valve 54 in the rebound inertial mass is provided primarily for minimizing a "water hammer" effect when the inertial mass returns to its rest position and the rebound valve closes. Rapid closure can cause an undesirable pressure surge. Any such pressure surge opens the relief valve and minimizes the influence of the pressure surge on the piston. A pressure relief valve could be provided in a different location for this purpose.

Although, one embodiment of flow sensitive inertia sensitive McPherson strut has been described and illustrated herein, it will be apparent that there may be many modifications, variations and embellishments of such a strut. For example, in the illustrated embodiment the flow sensitive feature is employed only with the rebound inertial member. If desired, such a flow sensitive feature may also be employed with the compression inertial valve 36. Sensitivity of the rebound inertial valve may also be modified by employing a low rate spring biasing the rebound mass downwardly.

In the illustrated embodiment, the flow ports are round and the ends of the inertial masses are essentially squared off. The "0" shapes can be varied and chamfers can be provided on the ends of the inertial masses for changing the flow characteristics through the inertial valves near the end of the stroke. Another modification is to provide pressure relief valves at the passages 49 and/or 51 through the upper plate.

Since there are many such modifications and variations which will be apparent to those skilled in the art. It is to be understood that the invention may be practiced otherwise than as specifically described.

What is claimed is:

1. An acceleration sensitive McPherson strut comprising:

an outer tube including means for connecting the outer tube to the wheel of a vehicle;

an inner tube fixed within the outer tube defining an annular gallery between the inner and outer tubes;

a piston sealed within the inner tube and connected to a piston rod extending out of the strut, the rod including means for connecting the rod to the body of the vehicle, the piston dividing the inside of the inner tube into an upper chamber and a lower chamber, the upper chamber being in fluid communication with the annular gallery;

means for passing fluid through the piston between the upper and lower chambers during either compression or extension of the strut;

a plug in the outer tube at the bottom of the inner tube;

a passage through the top of the plug in fluid communication with the lower chamber;

a conduit concentric with the tubes in fluid communication with the annular gallery;

a first port through the conduit;

an inertial mass surrounding the conduit and movable between a lower port-closed position and an upper port-open position for opening the rebound bypass passage upon downward acceleration of the strut tubes and increasing flow of fluid from the annular gallery into the lower chamber in the event of downward acceleration of the strut tubes during extension of the strut at more than a preselected magnitude;

a pressure relief valve in the inertial mass for permitting fluid flow from the annular gallery to the lower chamber when fluid pressure in the annular gallery is greater than a selected magnitude;

a second port in the bypass passage which is opened or closed by movement of the inertial mass;

a restricted flow path downstream from the second port, the restricted flow path having a smaller area for fluid flow than the second port during at least a portion of the stroke of the inertial mass from a port-closed position to a port-open position for maintaining the inertial mass in the port-open position in response to fluid flow from the annular gallery into the lower chamber;

an accumulator gallery inside the bottom of the outer tube;

a foot valve between the lower chamber and the accumulator gallery, the foot valve including a compression pressure relief valve for fluid flow from the lower chamber into the accumulator gallery and a rebound check valve for fluid flow from the accumulator gallery into the lower chamber;

a gas in the accumulator gallery and means for separating the gas from liquid shock absorber fluid in the accumulator gallery;

a central tube passing through the plug in fluid communication between the lower chamber and the foot valve;

a third port through a wall of the central tube;

a lower pressure relief valve bypassing the foot valve for flow into the accumulator gallery; and a movable inertial mass surrounding the central tube and movable between an upper port-closed position and a lower port-open position for opening the third port upon upward acceleration of the strut tubes during compression of the strut and increasing flow of fluid from the lower chamber through the lower pressure relief valve into the accumulator gallery in the event of upward acceleration of the strut tubes at more than a preselected magnitude.

2. An acceleration sensitive McPherson strut comprising:

inner and outer tubes defining an annular fluid return gallery therebetween and connected to a wheel of a vehicle;

a piston dividing the inner tube into an upper chamber and a lower chamber and connected to the chassis of a vehicle;

means for passing fluid through the piston between the upper and lower chambers at a restricted flow rate for damping spring action during either compression or rebound of the strut;

an accumulator gallery in the bottom of the outer tube;

a foot valve including a pressure relief valve for restricted fluid flow from the lower chamber into the accumulator gallery and a passage for unrestricted fluid flow from the accumulator gallery into the lower chamber; and means for permitting bypassing from the lower chamber into the accumulator gallery when upward acceleration of the tubes is greater than a preselected magnitude and preventing bypassing in the absence of such acceleration.

3. A McPherson strut as recited in claim 2 further comprising means for permitting bypassing from the annular gallery into the lower chamber when downward acceleration of the tubes is greater than a preselected magnitude.

4. An acceleration sensitive McPherson strut comprising:

an outer tube including means for connecting the outer tube to the wheel of a vehicle;

an inner tube fixed within the outer tube defining an annular gallery between the inner and outer tubes;

a piston sealed within the inner tube and connected to a piston rod extending out of the strut, the rod including means for connecting the rod to the body of the vehicle, the piston dividing the inside of the inner tube into an upper chamber and a lower chamber, the upper chamber being in fluid communication with the annular gallery;

means for passing fluid through the piston between the upper and lower chambers during either compression or extension of the strut;

a port between the lower chamber and the annular gallery;

a movable inertial mass in the rebound bypass passage for opening the port upon downward acceleration of the strut tubes and increasing flow of fluid from the annular gallery into the lower chamber in the event of downward acceleration of the strut tubes during extension of the strut at more than a preselected magnitude; and a restricted flow path downstream from the port, the restricted flow path having a smaller area for fluid flow than the port during at least a portion of the stroke of the inertial mass from a port-closed position to a port-open position.

5. A McPherson strut as recited in claim 4 further comprising a pressure relief valve for opening a flow path bypassing the port-closed position.

6. A McPherson strut as recited in claim 4 further comprising an annular passage surrounding a portion of the inertial mass downstream from the port, the area of the annular passage being less than the area of the port.

7. An acceleration sensitive McPherson strut comprising:

an outer tube including means for connecting the outer tube to the wheel of a vehicle;

an inner tube fixed within the outer tube defining an annular gallery between the inner and outer tubes;

a piston sealed within the inner tube and connected to a piston rod extending out of the strut, the rod including means for connecting the rod to the body of the vehicle, the piston dividing the inside of the inner tube into an upper chamber and a lower chamber, the upper chamber being in fluid communication with the annular gallery;

means for passing fluid through the piston between the upper and lower chambers during either compression or extension of the strut;

an accumulator gallery inside the bottom of the outer tube;

a foot valve between the lower chamber and the accumulator gallery, the foot valve including a compression pressure relief valve for fluid flow from the lower chamber into the accumulator gallery and a rebound check valve for fluid flow from the accumulator gallery into the lower chamber;

a compression bypass passage between the lower chamber and the accumulator gallery; and a movable inertial mass in the compression bypass passage for opening the compression bypass passage upon upward acceleration of the strut tubes during compression of the strut and increasing flow of fluid from the lower chamber into the accumulator gallery in the event of upward acceleration of the strut tubes at more than a preselected magnitude.

8. A McPherson strut as recited in claim 7 further comprising a gas in the accumulator gallery and means for separating the gas from liquid shock absorber fluid in the accumulator gallery.

9. A McPherson strut as recited in claim 7 comprising:

a central tube in fluid communication between the lower chamber and the foot valve;

a port through a wall of the central tube; and a pressure relief valve bypassing the foot valve for flow into the accumulator gallery; and wherein the movable inertial mass surrounds the central tube and is movable between an upper port-closed position and a lower port-open position.

10. An acceleration sensitive McPherson strut comprising:

an outer tube including means for connecting the outer tube to the wheel of a vehicle;

an inner tube fixed within the outer tube defining an annular gallery between the inner and outer tubes;

a piston sealed within the inner tube and connected to a piston rod extending out of the strut, the rod including means for connecting the rod to the body of the vehicle, the piston dividing the inside of the inner tube into an upper chamber and a lower chamber, the upper chamber being in fluid communication with the annular gallery;

means for passing fluid through the piston between the upper and lower chambers during either compression or extension of the strut;

an accumulator gallery inside the bottom of the outer tube;

a foot valve between the lower chamber and the accumulator gallery, the foot valve including a compression pressure relief valve for fluid flow from the lower chamber into the accumulator gallery and a rebound check valve for fluid flow from the accumulator gallery into the lower chamber;

a bypass passage in fluid communication between the lower chamber and one of the galleries; and a movable inertial mass in the bypass passage for opening the bypass passage upon acceleration of the strut tubes and increasing flow of fluid between the lower chamber and at least one of the galleries in the event of acceleration of the strut tubes at more than a preselected magnitude.

11. A McPherson strut as recited in claim 10 further comprising means for applying sufficient fluid pressure to the inertial mass for maintaining the inertial mass in a port-open position in response to fluid flow through the bypass passage.

12. A McPherson strut as recited in claim 11 wherein the means for applying fluid pressure comprises a port in the fluid passage which is opened or closed by movement of the inertial mass and a restricted flow path downstream from the port, the restricted flow path having a smaller area for fluid flow than the port during at least a portion of the stroke of the inertial mass from a port-closed position to a port-open position.

13. A McPherson strut as recited in claim 12 further comprising a pressure relief valve for opening a flow path bypassing the port-closed position.

14. An acceleration sensitive shock absorber as recited in claim 12 further comprising a check valve in series with the bypass passage.

15. A McPherson strut as recited in claim 12 wherein the restricted flow path comprises an annular clearance between the inertial mass and a fixed portion of the strut.

16. A McPherson strut as recited in claim 10 wherein the inertial mass is responsive to downward acceleration of the wheel of the vehicle.

17. A McPherson strut as recited in claim 10 wherein the inertial mass is in a bypass passage between the lower chamber and the accumulator gallery for bypassing fluid past the foot valve.

18. A McPherson strut as recited in claim 10 wherein the inertial mass is in a bypass passage between the lower chamber and the annular gallery for bypassing fluid past the piston.

19. An acceleration sensitive McPherson strut comprising:

an outer tube including means for connecting the outer tube to the wheel of a vehicle;

an inner tube fixed within the outer tube defining an annular gallery between the inner and outer tubes;

a piston sealed within the inner tube and connected to a piston rod extending out of the strut, the rod including means for connecting the rod to the body of the vehicle, the piston dividing the inside of the inner tube into an upper chamber and a lower chamber, the upper chamber being in fluid communication with the annular gallery;

means for passing fluid through the piston between the upper and lower chambers during either compression or extension of the strut;

a rebound bypass passage between the lower chamber and the annular gallery; and a movable inertial mass in the rebound bypass passage for opening the rebound bypass passage upon downward acceleration of the strut tubes and increasing flow of fluid from the annular gallery into the lower chamber in the event of downward acceleration of the strut tubes during extension of the strut at more than a preselected magnitude.

20. A McPherson strut as recited in claim 19 wherein the rebound bypass passage comprises;

a plug in the outer tube at the bottom of the inner tube, a passage through the top of the plug in communication with the lower chamber, a conduit concentric with the tubes in fluid communication with the annular gallery, and a port through the conduit, and wherein the inertial mass surrounds the conduit and is movable between a lower port-closed position and an upper port-open position.

21. A McPherson strut as recited in claim 19 further comprising a pressure relief valve in the inertial mass for permitting fluid flow from the annular gallery to the lower chamber when fluid pressure in the annular gallery is greater than a selected magnitude.

22. A McPherson strut as recited in claim 19 further comprising means for applying sufficient fluid pressure to the inertial mass for maintaining the inertial mass in a port-open position in response to fluid flow through the bypass passage.

23. A McPherson strut as recited in claim 22 wherein the means for applying fluid pressure comprises a port in the bypass passage which is opened or closed by movement of the inertial mass and a restricted flow path downstream from the port, the restricted flow path having a smaller area for fluid flow than the port during at least a portion of the stroke of the inertial mass from a port-closed position to a port-open position.

24. A McPherson strut as recited in claim 23 further comprising a pressure relief valve for opening a flow path bypassing the port-closed position.

25. An acceleration sensitive McPherson strut comprising:

inner and outer tubes defining an annular fluid return gallery therebetween and connected to a wheel of a vehicle;

a piston dividing the inner tube into an upper chamber and a lower chamber and connected to the chassis of a vehicle;

means for passing fluid through the piston between the upper and lower chambers at a restricted flow rate for damping spring action during either compression or rebound of the strut;

an accumulator gallery in the bottom of the outer tube;

a foot valve including a pressure relief valve for restricted fluid flow from the lower chamber into the accumulator gallery and a passage for unrestricted fluid flow from the accumulator gallery into the lower chamber;

a fluid flow port and an inertial mass adjacent to the port having a port-closed position in the absence of acceleration and a port-open position in response to acceleration of the tubes greater than a preselected magnitude for bypassing fluid between the lower chamber and one of the galleries; and means for biasing the inertial mass toward the port-open position in response to fluid flow through the fluid flow port.

26. An acceleration sensitive McPherson strut comprising:

inner and outer tubes defining an annular fluid return gallery therebetween and connected to a wheel of a vehicle;

a piston dividing the inner tube into an upper chamber and a lower chamber and connected to the chassis of a vehicle;

means for passing fluid through the piston between the upper and lower chambers at a restricted flow rate for damping spring action during either compression or rebound of the strut;

a port for bypassing fluid between the lower chamber and the gallery;

an inertial mass adjacent to the port having a port-closed position in the absence of acceleration and a port-open position in response to acceleration of the tubes greater than a preselected magnitude; and an annular passage surrounding a portion of the inertial mass downstream from the port, the cross-sectional area for flow through the annular passage being less than the cross-sectional area for flow through the port.

27. An acceleration sensitive McPherson strut comprising:

inner and outer tubes defining an annular fluid return gallery therebetween and connected to a wheel of a vehicle;

a piston dividing the inner tube into an upper chamber and a lower chamber and connected to the chassis of a vehicle;

means for passing fluid through the piston between the upper and lower chambers at a restricted flow rate for damping spring action during either compression or rebound of the strut;

an accumulator gallery in the bottom of the outer tube;

a gas in the accumulator gallery and means for separating the gas from liquid shock absorber fluid in the accumulator gallery;

a foot valve including a pressure relief valve for restricted fluid flow from the lower chamber into the accumulator gallery and a passage for unrestricted fluid flow from the accumulator gallery into the lower chamber; and means for bypassing fluid between the lower chamber and one of the galleries, including means for permitting bypassing when acceleration of the tubes is greater than a preselected magnitude and preventing bypassing in the absence of such acceleration.

28. A McPherson strut as recited in claim 1 wherein the means for bypassing comprises means for permitting bypassing from the annular gallery into the lower chamber when downward acceleration of the tubes is greater than a preselected magnitude.

29. A McPherson strut as recited in claim 28 further comprising means for sustaining bypassing in response to fluid flow through the means for bypassing.

30. A McPherson strut as recited in claim 27 wherein the means for permitting bypassing comprises a fluid flow port between the lower chamber and one of the galleries and the means for sustaining comprises a restricted fluid flow path downstream from the port for applying fluid pressure to the means for permitting.

31. A McPherson strut as recited in claim 30 wherein the means for bypassing comprises a fluid flow port and an inertial mass adjacent to the port having a port-closed position in the absence of acceleration and a port-open position in response to acceleration of the tubes greater than a preselected magnitude.

32. A McPherson strut as recited in claim 1 further comprising means for sustaining bypassing in response to fluid flow through the means for bypassing.

33. A McPherson strut as recited in claim 32 wherein the means for permitting bypassing comprises a fluid flow port between the lower chamber and one of the galleries and the means for sustaining comprises a restricted fluid flow path downstream from the port for applying fluid pressure to the means for permitting.

34. A McPherson strut as recited in claim 1 wherein the means for bypassing comprises a fluid flow port and an inertial mass adjacent to the port having a port-closed position in the absence of acceleration and a port-open position in response to acceleration of the tubes greater than a preselected magnitude.

35. A McPherson strut as recited in claim 34 further comprising an annular passage surrounding a portion of the inertial mass downstream from the port, the area of the annular passage being less than the area of the port for biasing the means for bypassing open.

36. A McPherson strut as recited in claim 34 further comprising means for sustaining bypassing in response to fluid flow through the means for bypassing.

37. A McPherson strut as recited in claim 36 wherein the means for sustaining comprises a restricted fluid flow path downstream from the port for applying fluid pressure to the inertial mass.

\* \* \* \* \*